US012539876B2

(12) United States Patent
Kaneda et al.

(10) Patent No.: US 12,539,876 B2
(45) Date of Patent: Feb. 3, 2026

(54) BEHAVIORAL CHANGE PROMOTION DEVICE

(71) Applicant: NTT DOCOMO, INC., Chiyoda-ku (JP)

(72) Inventors: Yukimasa Kaneda, Chiyoda-ku (JP); Gentarou Katayama, Chiyoda-ku (JP); Hiroshi Kawakami, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 108 days.

(21) Appl. No.: 18/553,587

(22) PCT Filed: Mar. 11, 2022

(86) PCT No.: PCT/JP2022/011025
§ 371 (c)(1),
(2) Date: Oct. 2, 2023

(87) PCT Pub. No.: WO2022/215435
PCT Pub. Date: Oct. 13, 2022

(65) Prior Publication Data
US 2024/0182062 A1    Jun. 6, 2024

(30) Foreign Application Priority Data
Apr. 7, 2021  (JP) .................... 2021-065147

(51) Int. Cl.
*B60W 50/14*    (2020.01)
(52) U.S. Cl.
CPC .................. *B60W 50/14* (2013.01)
(58) Field of Classification Search
CPC ........... B60W 50/14; B60W 50/16; B60W 2050/143; B60W 2050/146; B60Q 9/002
(Continued)

(56) References Cited

U.S. PATENT DOCUMENTS

| 11,249,544 B2 * | 2/2022 | Sicconi ................... G06F 3/011 |
| 12,286,107 B2 * | 4/2025 | Tanaka .............. B60W 50/0097 |

(Continued)

FOREIGN PATENT DOCUMENTS

| JP | 2008-238831 A | 10/2008 |
| JP | 2011-14037 A  | 1/2011  |

OTHER PUBLICATIONS

International Search Report mailed on Jun. 14, 2022 in PCT/JP2022/011025 filed on Mar. 11, 2022.

(Continued)

*Primary Examiner* — Tuan C To
(74) *Attorney, Agent, or Firm* — Oblon, McClelland, Maier & Neustadt, L.L.P.

(57) ABSTRACT

A behavioral change promotion device includes a learning unit configured to build a prediction model used for estimating a risk by performing learning with learning user information and risk information being associated with each other and build a causal model used for estimating a risk causal effect by performing learning with information relating to a risk factor and the risk information being associated with each other; an estimation unit configured to estimate a risk of the user by inputting estimation user information to a prediction model and estimate a risk causal effect by inputting information relating to a risk factor to a causal model; an advice generating unit configured to generate advice information including at least the risk and the risk causal effect; and an output unit configured to output the advice information.

11 Claims, 10 Drawing Sheets

(58) Field of Classification Search
USPC .............................................................. 701/1
See application file for complete search history.

(56) References Cited

U.S. PATENT DOCUMENTS

| 2020/0057487 | A1* | 2/2020 | Sicconi | G06F 3/011 |
| 2022/0005041 | A1* | 1/2022 | Chang | G06F 18/24 |
| 2022/0059230 | A1* | 2/2022 | Muse | G16H 50/20 |
| 2022/0068494 | A1* | 3/2022 | Op Den Buijs | G16H 80/00 |

OTHER PUBLICATIONS

International Preliminary Report on Patentability and Written Opinion issued Oct. 19, 2023 in PCT/JP2022/011025, 5 pages.

\* cited by examiner

Fig.2

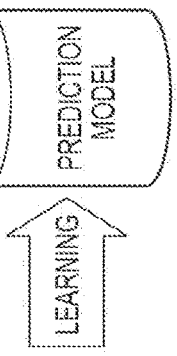
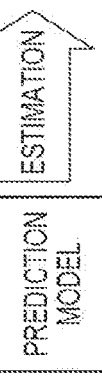

AT TIME OF LEARNING
FEATURE AMOUNT (USER INFORMATION)

| PERSON IDENTIFIER | DRIVING TIME AT TIME OF ACCUMULATION OF SNOW | EXPRESSWAY DRIVING TIME | AGE | REGION | ... |
|---|---|---|---|---|---|
| XXXX | 60 MINUTES | 30 MINUTES | 30'S | A | ... |
| YYYY | 120 MINUTES | 60 MINUTES | 40'S | B | ... |

RISK INFORMATION

| PERSON IDENTIFIER | RISK |
|---|---|
| XXXX | PRESENCE |
| YYYY | ABSENCE |

LEARNING → PREDICTION MODEL

AT TIME OF ESTIMATION
FEATURE AMOUNT (USER INFORMATION)

| PERSON IDENTIFIER | DRIVING TIME AT TIME OF ACCUMULATION OF SNOW | EXPRESSWAY DRIVING TIME | AGE | REGION | ... |
|---|---|---|---|---|---|
| XXXX | 60 MINUTES | 30 MINUTES | 30'S | A | ... |
| YYYY | 120 MINUTES | 60 MINUTES | 40'S | B | ... |

PREDICTION MODEL → ESTIMATION

ESTIMATION RISK INFORMATION

| PERSON IDENTIFIER | RISK |
|---|---|
| XXXX | 80 |
| YYYY | 60 |

Fig.4

(a) USER INFORMATION

| PERSON IDENTIFIER | DRIVING TIME AT TIME OF ACCUMULATION OF SNOW | EXPRESSWAY DRIVING TIME | AGE | REGION | ... |
|---|---|---|---|---|---|
| XXXX | 60 MINUTES | 30 MINUTES | 30'S | A | ... |
| YYYY | 120 MINUTES | 60 MINUTES | 40'S | B | ... |

(b) RISK INFORMATION

| PERSON IDENTIFIER | RISK |
|---|---|
| XXXX | PRESENCE |
| YYYY | ABSENCE |

Fig.5

(a) ESTIMATION RISK INFORMATION

| PERSON IDENTIFIER | ESTIMATED RISK |
|---|---|
| XXXX | 80 |
| YYYY | 60 |

(b) CAUSAL EFFECT INFORMATION

| PERSON IDENTIFIER | RISK FACTOR | RISK CAUSAL EFFECT | FEATURE | DEGREE OF INFLUENCE |
|---|---|---|---|---|
| XXXX | DRIVING TIME AT TIME OF ACCUMULATION OF SNOW: 60 MINUTES OR MORE | 30 | AGE: 30'S | 10 |
| | | | REGION: A | 20 |
| | EXPRESSWAY DRIVING TIME: 60 MINUTES OR MORE | 20 | AGE: 30'S | 15 |
| | | | REGION: A | 5 |
| YYYY | DRIVING TIME AT TIME OF ACCUMULATION OF SNOW: 60 MINUTES OR MORE | 20 | AGE: 40'S | 5 |
| | | | REGION: B | 15 |
| | EXPRESSWAY DRIVING TIME: 60 MINUTES OR MORE | 10 | AGE: 40'S | 5 |
| | | | REGION: B | 5 |

ADVICE MASTER INFORMATION

| RISK FACTOR | ADVICE DETAIL |
|---|---|
| DRIVING TIME AT TIME OF ACCUMULATION OF SNOW: 60 MINUTES OR MORE | LET'S HAVE INTER-VEHICLE DISTANCE OF APPROPRIATE DISTANCE OR MORE ALL THE TIME |
| EXPRESSWAY DRIVING TIME: 60 MINUTES OR MORE | LET'S USE NAVIGATION |

(b)

ADVICE INFORMATION

| PERSON IDENTIFIER | ESTIMATED RISK | RISK FACTOR | RISK CAUSAL EFFECT | FEATURE | DEGREE OF INFLUENCE | ADVICE DETAIL |
|---|---|---|---|---|---|---|
| XXXX | 80 | DRIVING TIME AT TIME OF ACCUMULATION OF SNOW: 60 MINUTES OR MORE | 30 | AGE: 30'S, REGION: A | AGE: 10'S, REGION: 20 | LET'S HAVE INTER-VEHICLE DISTANCE OF APPROPRIATE DISTANCE OR MORE ALL THE TIME |

BEHAVIORAL CHANGE PROMOTION DEVICE

TECHNICAL FIELD

One aspect of the present invention relates to a behavioral change promotion device.

BACKGROUND ART

Conventionally, a technology for encouraging a user to perform a behavioral change for reducing a risk by analyzing the state of an individual user on the basis of user information, clarifying the risk and risk factors of an unexpected situation (an accident or the like) for a user on the basis of an analysis result, and presenting advice information including that information to the user is known (for example, see Patent Literature 1 and Patent Literature 2).

CITATION LIST

Patent Literature

[Patent Literature 1] Japanese Unexamined Patent Publication No. 2011-14037
[Patent Literature 2] Japanese Unexamined Patent Publication No. 2008-238831

SUMMARY OF INVENTION

Technical Problem

Here, in the technology described above, it cannot be determined that influences of risk factors on the risk are appropriately derived, and there are cases in which, even when advice information including such a risk and risk factors is presented to a user, the user cannot accurately perceive his or her risk. In this case, it is difficult to encourage a user to perform an effective behavioral change.

One aspect of the present invention is in consideration of the situation described above, and an object thereof is to encourage a user to perform an effective behavioral change.

Solution to Problem

A behavioral change promotion device according to one aspect of the present invention presents information used for reducing a risk of an unexpected situation to a user, the behavioral change promotion device including: a first learning unit configured to build a first learning model used for estimating a risk of the user by performing learning with learning user information relating to the user and risk information that is information relating to the risk of the user being associated with each other; a second learning unit configured to build a second learning model used for estimating a risk causal effect that is a degree of increase of a risk according to having a risk factor by performing learning with information relating to a risk factor having an influence on a risk that is information included in the learning user information and the risk information being associated with each other; a first estimation unit configured to estimate the risk of the user by inputting estimation user information relating to the user to the first learning model; a second estimation unit configured to estimate the risk causal effect using the second learning model; an advice generating unit configured to generate advice information including at least the risk estimated by the first estimation unit and the risk causal effect estimated by the second estimation unit; and an output unit configured to output the advice information.

In the behavioral change promotion device according to one aspect of the present invention, the first learning model estimating a risk from the user information and the risk information is built, and the second learning model estimating the risk causal effect that is a degree of increase of the risk according to having a risk factor from information relating to the risk factor included in the user information and the risk information is built. Then, in the behavioral change promotion device according to one aspect of the present invention, a risk of a user is estimated by inputting estimation user information to the first learning model, and a risk causal effect is estimated using the second learning model, advice information including the risk and the risk causal effect is generated, and the risk advice information is output. In this way, according to the behavioral change promotion device, in addition to the first learning model estimating a risk, the second learning model estimating a risk causal effect that is a degree of increase of the risk according to having the risk factor is built, and a risk causal effect according to a predetermined risk factor is estimated using this second learning model. By generating and outputting the advice information including such a risk causal effect, a degree of increase of the risk according to having the risk factor is presented to the user, and the user is allowed to be able to accurately perceive an influence of the risk factor on the risk. In accordance with this, it is possible to encourage the user to perform an effective behavioral change against the risk.

Advantageous Effects of Invention

According to the present invention, it is possible to encourage a user to perform an effective behavioral change.

BRIEF DESCRIPTION OF DRAWINGS

FIG. 2 is a diagram illustrating a learning process image and an estimation process image relating to risk estimation.
FIG. 4 is a diagram illustrating an example of user information and risk information.
FIG. 5 is a diagram illustrating an example of estimation risk information and causal effect information.
FIG. 6 is a diagram illustrating an example of advice master information and advice information.

DESCRIPTION OF EMBODIMENTS

Figure 1:
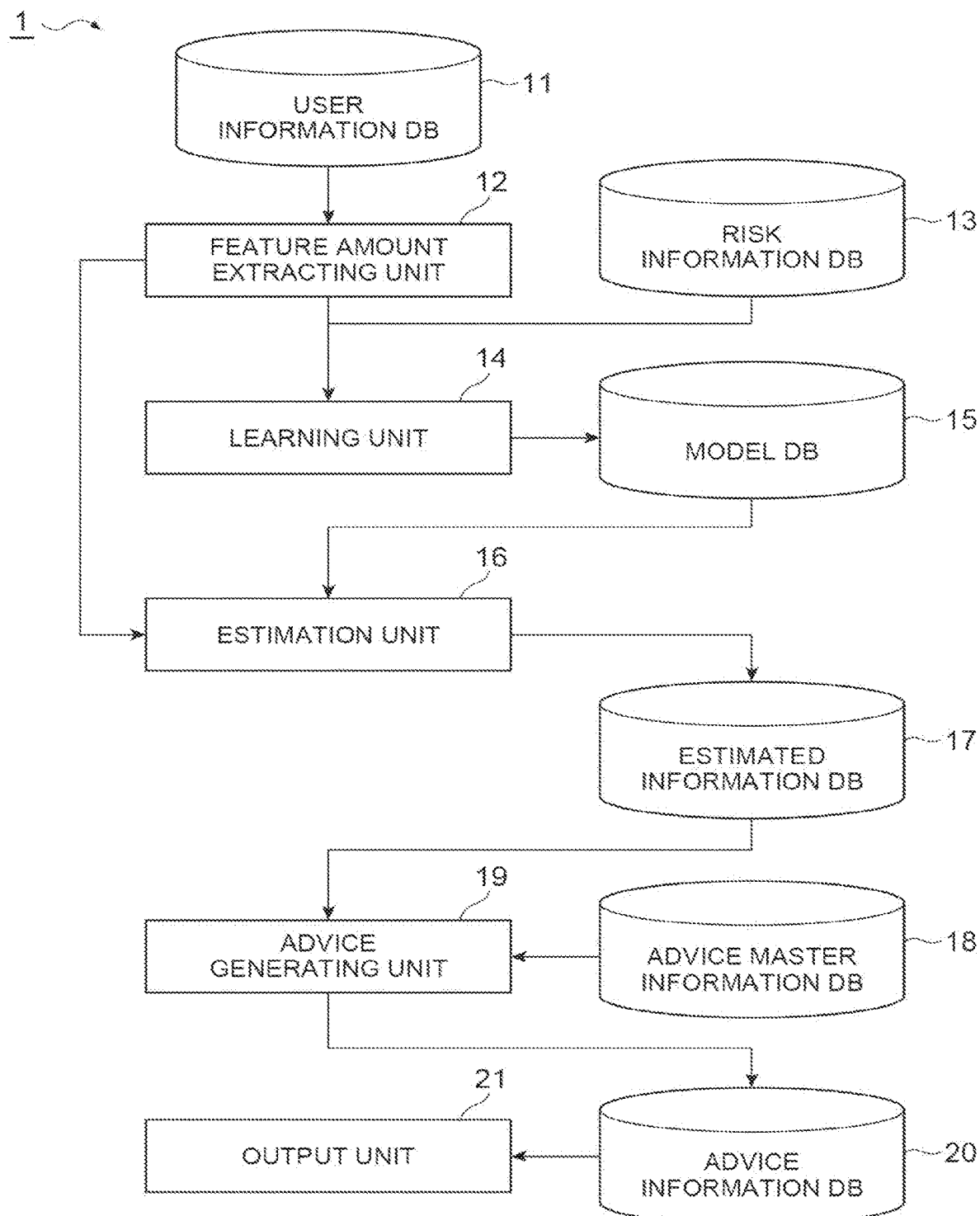
FIG. 1 is a functional block diagram of a behavioral change promotion device according to this embodiment.

Hereinafter, an embodiment of the present invention will be described in detail with reference to the attached drawings. In description of the drawings, the same reference numeral will be used for the same or equivalent elements, and duplicate description will be omitted.

FIG. 1 is a functional block diagram of a behavioral change promotion device 1 according to this embodiment. The behavioral change promotion device 1 is a device that presents information for reducing a risk of an unexpected situation to a predetermined user. The behavioral change promotion device 1 according to this embodiment presents information for reducing a risk of an accident during driving that is an unexpected situation occurring for a user performing driving (that is, a driver). For example, a risk of an accident is presence/absence of occurrence of an accident, the number of occurrences of accidents, a magnitude of damage at the time of occurrence of an accident, or the like. Hereinafter, an example in which "a risk of an accident" is "presence/absence of occurrence of an accident" will be described. The behavioral change promotion device 1, for example, is disposed to be able to communicate with a communication device (controller) of a vehicle driven by an individual user and transmits (presents) information for reducing a risk to the communication device of the vehicle driven by the user. The behavioral change promotion device 1, for example, may transmit (present) information for reducing a risk to a terminal such as a smartphone or the like held by the user through email or the like.

As illustrated in FIG. 1, the behavioral change promotion device 1 includes a user information DB 11, a feature amount extracting unit 12, a risk information DB 13, a learning unit 14 (a first learning unit and a second learning unit), a model DB 15, an estimation unit 16 (a first estimation unit, a second estimation unit, and a calculation unit), an estimation information DB 17, an advice master information DB 18, an advice generating unit 19, an advice information DB 20, and an output unit 21.

The user information DB 11 is a database storing user information that is information relating to the individual user. The user information mainly includes mobility data and non-mobility data. The mobility data is data relating to the user's driving. The non-mobility data is the user's data not directly related to driving such as attribute information, behavior information, and the like of the user. The mobility data, for example, is collected from sensors included in a vehicle, a drive recorder, survey information, or the like. The non-mobility data, for example, is collected from an information device held by a user, a service use log, survey information, or the like. FIG. 4(a) is an example of some user information stored in the user information DB 11. In the example illustrated in FIG. 4(a), a person identifier that is used for uniquely identifying a user, a driving time at the time of accumulation of snow, an expressway driving time, an age, and a region are associated with each other as user information. In such user information, the age and the region represent non-mobility data, and the driving time at the time of accumulation of snow and the expressway driving time represent mobility data. In the example of an upper stage of FIG. 4(a), it is represented that a driving time at the time of accumulation of snow of a user represented using a person identifier of "XXXX" is 60 minutes, an expressway driving time is 30 minutes, an age is 30's, and a region (for example, a residential region) is A.

The feature amount extracting unit 12 has a function of extracting a feature amount from user information stored in the user information DB 11. The feature amount extracting unit 12 extracts a feature amount from user information on the basis of an arbitrary rule set in advance. The feature amount extracting unit 12 may set some or all of the user information stored in the user information DB 11 as a feature amount as it is or may extract a feature amount generated by performing a predetermined process (a deriving process) on some or all of the user information stored in the user information DB 11. The feature amount extracting unit 12 uses at least the person identifier as a key to extract a feature amount (a record in units of person identifiers) associated therewith. In addition, the feature amount extracting unit 12 may use the person identifier and a date and time identifier as keys to extract a feature amount (a record in units of combinations of a person identifier and a date and time identifier) associated therewith. A timing of a feature amount extracting process performed by the feature amount extracting unit 12 may be an arbitrary timing, or the feature amount extracting process may be repeatedly performed at a predetermined time interval.

The risk information DB 13 is a database storing risk information that represents presence/absence of a risk (presence/absence of occurrence of an accident) for the individual user. FIG. 4(b) is an example of some risk information stored in the risk information DB 13. In the example illustrated in FIG. 4(b), as the risk information, a person identifier used for uniquely identifying a user and presence/absence of a risk are stored in association with each other.

The learning unit 14 has a function of performing first learning of building a prediction model (a first learning model) for estimating a risk of a user and second learning of building a causal model (a second learning model) for estimating a risk causal effect that is a degree of increase of a risk according to having a risk factor. A timing for building a prediction model and a causal model using the learning unit 14 may be an arbitrary timing. When a new prediction model or a new causal model is built, the learning unit 14 may store the new prediction model or the new causal model in the model DB 15 in place of an existing prediction model or an existing causal model. The model DB 15 stores the prediction model and the causal model generated by the learning unit 14.

In the first learning, the learning unit 14 learns user information (learning user information) and risk information in association with each other and builds a prediction model for estimating a risk of a user. In detail, the user information described here is a feature amount extracted by the feature amount extracting unit 12. The risk information is risk information that is stored in the risk information DB 13. The learning unit 14 generates learning data by associating a feature amount and risk information, for example, a person identifier with a key. When association is performed, a date and time identifier of the feature amount and a date and time identifier of the risk information may be different from each other. For example, the feature amount may be data observed over a period of N years, and the risk information to be associated therewith may be data observed over a period of (N+1) years.

FIG. 2 is a diagram illustrating a process image of the first learning relating to risk estimation (an upper stage) and an estimation process image (a lower stage). In the example illustrated in the upper stage of FIG. 2, in the first learning, after a feature amount with which a driving time at the time of accumulation of snow, an expressway driving time, an age, and a region are associated and risk information that is an objective variable are associated with each other, learning is performed, and a prediction model is built. The building of this prediction model, for example, may be performed using an existing supervised learning algorithm, and for example, may be performed using an existing statistics technique of predicting a risk from a feature amount or a machine learning technique (logistic regression, a gradient boosting decision tree, a neural network, or the like). In more detail, as in this embodiment, in a case in which risk information is represented using category information such as presence/absence of occurrence of an accident, a prediction model is built using a classification model, and in a case in which risk information is represented using numerical data such as a magnitude of damage at the time of occurrence of an accident, a prediction model may be built using a regression model.

In the second learning, the learning unit 14 performs learning by associating information included in user information (learning user information) relating to a risk factor having an influence on the risk and risk information with each other and builds a causal model used for estimating a risk causal effect that is a degree of increase of the risk according to the risk factors. In the information relating to a risk factor, for example, a feature amount that is the risk factor and a feature amount having an influence on at least one of the risk factor or the risk are included. The learning unit 14 performs learning by associating a feature amount that is a risk factor, a feature amount having an influence on at least one of the risk factor or the risk, and risk information with each other and builds a causal model. In detail, the information relating to a risk factor described here (that is, a feature amount that is the risk factor and a feature amount having an influence on at least one of the risk factor or the risk) is a feature amount that is extracted by the feature amount extracting unit 12. In addition, the risk information is risk information that is stored in the risk information DB 13. The learning unit 14 generates learning data by associating the feature amount that is the risk factor, the feature amount having an influence on at least one of the risk factor or the risk, and the risk information, for example, with a person identifier used as a key. When association is performed, a date and time identifier of each feature amount and a date and time identifier of the risk information may be different from each other. For example, each feature amount may be data observed over a period of N years, and the associated risk information may be data observed over a period of (N+1) years. In addition, in the second learning, a feature amount having an influence on at least one of the risk factor or the risk may not be used. In other words, the learning unit 14 may build a causal model by performing learning with a feature amount that is a risk factor and risk information being associated with each other.

Figure 3:
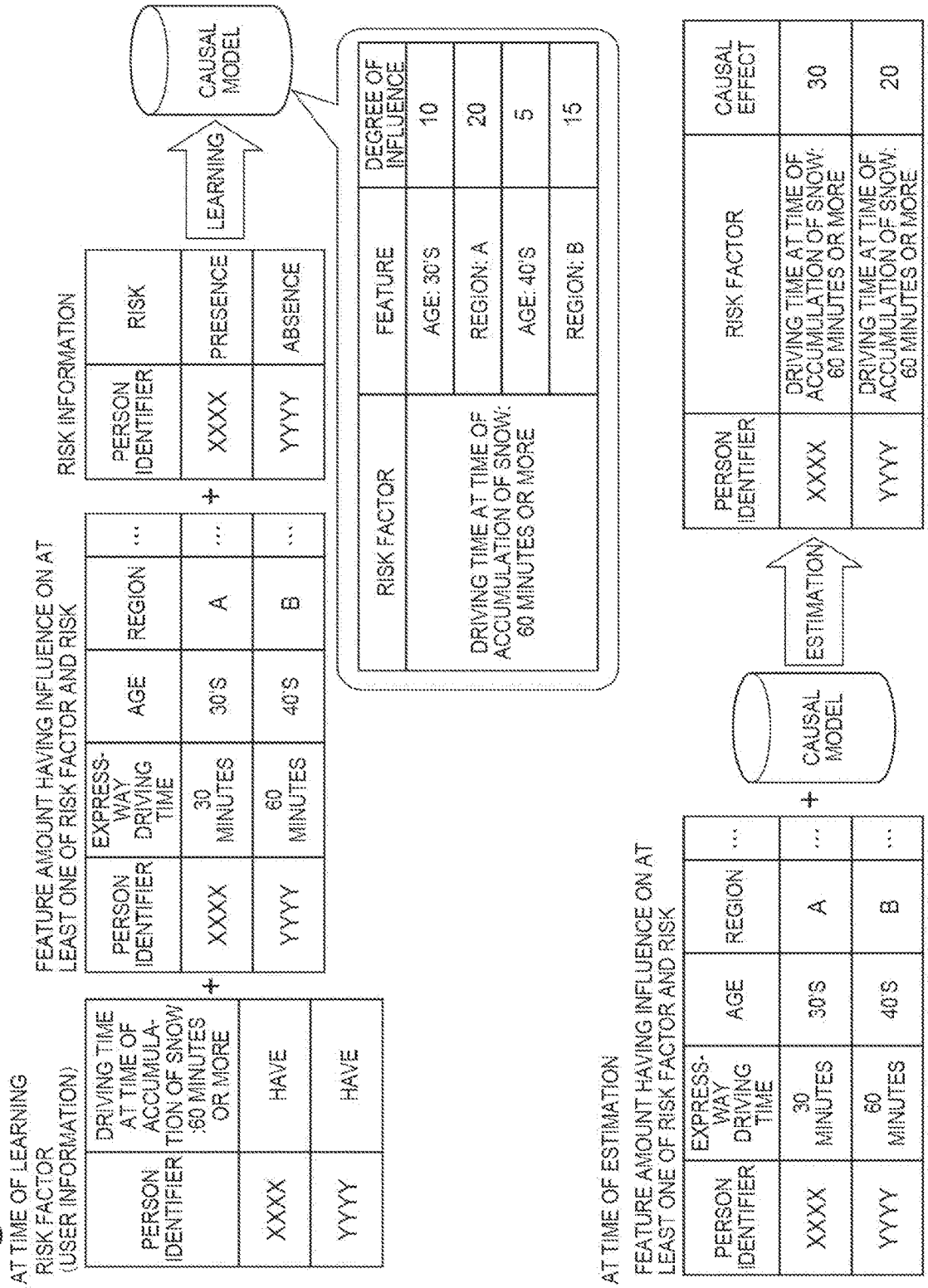
FIG. 3 is a diagram illustrating a learning process image and an estimation process image relating to estimation of a risk causal effect.

FIG. 3 is a diagram illustrating a second learning process image (an upper stage) and an estimation process image (a lower stage) relating to estimation of a risk causal effect. In the example illustrated in the upper stage of FIG. 3, in the second learning, for "the driving time at the time of accumulation of snow: 60 minutes or more" that is a predetermined risk factor, as feature amounts having an influence on at least one of the risk factor or the risk, an expressway driving time, age, and a region are selected and are associated with risk information, and learning is performed, whereby a causal model is built. Such a causal model is a model that calculates a risk causal effect of a predetermined risk factor for each user on the basis of a feature amount (a feature amount having an influence on at least one of the risk factor and the risk) extracted from information included in the user information. For example, the building of this causal model may be performed using an existing causal inference technique (Meta-Learners or the like) that can estimate a degree of increase of risk (a risk causal effect) by having a predetermined risk factor in a predetermined user from feature amounts having influences on at least one of the risk factor or the risk. In addition, by using another causal inference technique such as a regression model or the like, instead of calculating a risk causal effect of each user, an average risk causal effect of users may be calculated. A feature amount for a predetermined risk factor (a feature amount having an influence on at least one of the risk factor or the risk) may be selected using an arbitrary method. A causal model may be built in correspondence with the number of kinds of risk factors. The risk factors, for example, may be "the driving time at the time of accumulation of snow: 60 minutes or more", "the expressway driving time: 60 minutes or more", and the like. Regarding risk factors, one risk factor may be configured by combining a plurality of risk factors. In other words, for example, "the driving time at the time of accumulation of snow: 60 minutes or more and the expressway driving time: 60 minutes or more" may be regarded as one risk factor.

The estimation unit 16 has a function for performing first estimation estimating a user's risk using a prediction model and second estimation estimating a risk causal effect using a causal model. The timings of estimation of a risk and estimation of a risk causal effect using the estimation unit 16 may be arbitrary timings. The estimation unit 16 stores estimation risk information (see FIG. 5(a)) derived (estimated) through the first estimation and causal effect information (information including a risk causal effect and the like) (see FIG. 5(b)) derived (estimated) through the second estimation in the estimation information DB 17. The estimation information DB 17 stores the estimation risk information and the causal effect information estimated by the estimation unit 16.

In the first estimation, by inputting user information (estimation user information) to the prediction model stored in the model DB 15, the estimation unit 16 estimates a risk of a user represented in the user information. In details the user information described here is a feature amount extracted by the feature amount extracting unit 12.

In the example illustrated in the lower stage of FIG. 2, in the first estimation, by inputting a feature amount with which a driving time at the time of accumulation of snow, an expressway driving time, age, and a region are associated to a prediction model, estimated risk information representing a user's risk is derived. FIG. 5(a) is a diagram illustrating an example of estimated risk information. In the example illustrated in FIG. 5(a), information in which a person identifier used for uniquely identifying a user and a value (a probability, a score, or the like) representing a risk are associated with each other is configured as estimated risk information.

In the second estimation, the estimation unit 16 estimates a risk causal effect using a causal model. More specifically, by inputting a feature amount having an influence on at least one of a risk factor or a risk that is information included in the user information (the estimated user information) and is included in information relating the risk factor having an influence on the risk to the causal model stored in the model DB 15, the estimation unit 16 estimates a risk causal effect of a predetermined risk factor in a predetermined user. In addition, in a case in which an average risk causal effect of users is calculated instead of calculating a risk causal effect of each user using any other causal inference technique such as a regression model or the like, by referring to a parameter (a regression coefficient of a risk factor) of a learned causal model or the like, the average risk causal effect of the users may be calculated. Thereafter, by referring to information relating to having/no-having of a predetermined risk factor from the user information of a predetermined user, the estimation unit 16 may derive a risk causal effect of this user for a risk factor held by this user on the basis of an output result of the causal model for this risk factor and information relating to having/no-having of this risk factor.

In the example illustrated in a lower stage of FIG. 3, in the second estimation, by inputting a feature amount having an influence on at least one of a risk factor or a risk with which an expressway driving time, age, and a region are associated to a causal model, a risk causal effect that is a degree of increase of a risk according to having a predetermined risk factor is estimated. Information of the age, the region, and the like is a feature amount having an influence on at least one of a risk factor or a risk and is information representing a feature of a user.

The estimation unit 16 may further calculate a degree of influence of a feature amount, which has an influence on at least one of a risk factor or a risk, on a risk causal effect on the basis of the causal model. In other words, the estimation unit 16 may calculate a degree of influence of a feature of a user, which is a feature amount having an influence on at least one of a risk factor or a risk, on a risk causal effect in the second estimation and include this degree of influence in the causal effect information (see FIG. 5(*b*)). A feature of a user that is a feature amount having an influence on at least one of a risk factor or a risk is, for example, information of age, a region, and the like of a user included in the user information. More specifically, for example, when a causal model is built, by building a model estimating a risk causal effect of each user using an algorithm (a linear model, a gradient boosting decision tree, or the like) capable of calculating a degree of importance of a feature amount used for learning, a degree of influence of a predetermined feature amount (a feature amount having an influence on at least one of a risk factor or a risk) on an increase of the risk causal effect can be calculated from a learned model. In addition, on the basis of the degree of influence of the predetermined feature amount (a feature amount having an influence on at least one of a risk factor or a risk) in the risk causal effect of the predetermined risk factor calculated above and the information relating to having/no-having of this feature amount (the feature amount having an influence on at least one of a risk factor or a risk) in a predetermined user, a degree of influence of a feature amount (a feature amount having an influence on at least one of a risk factor or a risk) held by the user in the risk causal effect of this risk factor may be calculated. FIG. 5(*b*) is a diagram illustrating an example of causal effect information including a risk causal effect derived by the estimation unit 16. In the example illustrated in FIG. 5(*b*), in addition to the risk causal effect, degrees of influence of age and a region representing features of the user, which are feature amounts having an influence on at least one of a risk factor or a risk, on the risk causal effect are included in the causal effect information. In the example illustrated in FIG. 5(*b*), as risk factors, there are "the driving time at the time of accumulation of snow: 60 minutes or more" and "the expressway driving time: 60 minutes or more". In the example illustrated in FIG. 5(*b*), for each of the risk factors ("the driving time at the time of accumulation of snow: 60 minutes or more" and "the expressway driving time: 60 minutes or more") of each user identified by a person identifier, a degree of influence for each of the feature amounts (the age and the region) for the risk causal effect and the risk causal effect is derived.

The advice master information DB 18 is a database that stores advice master information in which a risk factor and an advice detail are associated with each other. FIG. 6(*a*) is a diagram illustrating an example of the advice master information. In the advice information illustrated in FIG. 6(*a*), an advice detail of "Let's have an inter-vehicle distance of an appropriate distance or more all the time" is associated with the risk factor of "the driving time at the time of accumulation of snow: 60 minutes or more". In addition, an advice detail of "Let's use navigation" is associated with the risk factor of "the expressway driving time: 60 minutes or more".

The advice generating unit 19 generates advice information that includes at least a risk estimated by the estimation unit 16 in the first estimation and a risk causal effect estimated by the estimation unit 16 in the second estimation. The advice generating unit 19 acquires a risk and a risk causal effect from the estimated information DB 17 by associating at least a person identifier as a key. In addition, in details, the advice generating unit 19 generates advice information that further includes a degree of influence of a feature (a feature amount having an influence on at least one of a risk factor or a risk) of a user for a risk causal effect that is estimated by the estimation unit 16 in the second estimation. The advice generating unit 19 acquires a degree of influence of the feature of the user for the risk causal effect from the estimated information DB 17. In addition, in more detail, the advice generating unit 19 generates advice information further including a behavioral change promotion detail that is information associated with a risk factor relating to a risk causal effect estimated in the second estimation in advance and is information representing a behavior that the user is encouraged to perform for reducing the risk. By referring to the advice master information DB 18, the advice generating unit 19 acquires an advice detail (a behavioral change promotion detail) associated with the risk factor. A timing of generation of advice information performed by the advice generating unit 19 may be an arbitrary timing. The advice generating unit 19 stores the generated advice information in the advice information DB 20. The advice information DB 20 stores the advice information.

FIG. 6(*b*) is a diagram illustrating an example of the advice information. In the example illustrated in FIG. 6(*b*), estimated risk of a user represented by a person identifier "XXXX" is "80", a risk factor is "the driving time at the time of accumulation of snow: 60 minutes or more", a risk causal effect is "30", a degree of influence of features "the age: 30's, the region: A" for the risk factor is "the age: 10's, the region: 20", and an advice detail associated with the risk factor is "Let's have an inter-vehicle distance of an appropriate distance or more all the time".

The output unit 21 outputs the advice information stored in the advice information DB 20. The output unit 21, for example, transmits the advice information to a communication device (a controllers) of a vehicle driven by a user represented by the person identifier. Then, this advice information is presented to a display of the vehicle driven by the user. In addition, advice information may be output using a voice in the vehicle driven by the user. Furthermore, for example, the output unit 21 may transmit the advice information to an information device such as a smartphone or the like held by the user represented by the person identifier through a mail or the like.

The output unit 21 may output the advice information in a stepped manner and, for example, may, first, output a risk estimated by the estimation unit 16 in the first estimation, then, output a risk causal effect estimated by the estimation unit 16 in the second estimation, and, finally, output an advice detail (a behavioral change promotion detail). In addition, for the advice information, after a risk causal effect is output in the description described above, before an advice detail (a behavioral change promotion detail) is output, the output unit 21 may output a degree of influence of a feature (a feature amount having an influence on at least one of a risk factor or a risk) of a user for the risk causal effect estimated by the estimation unit 16.

Figure 7:
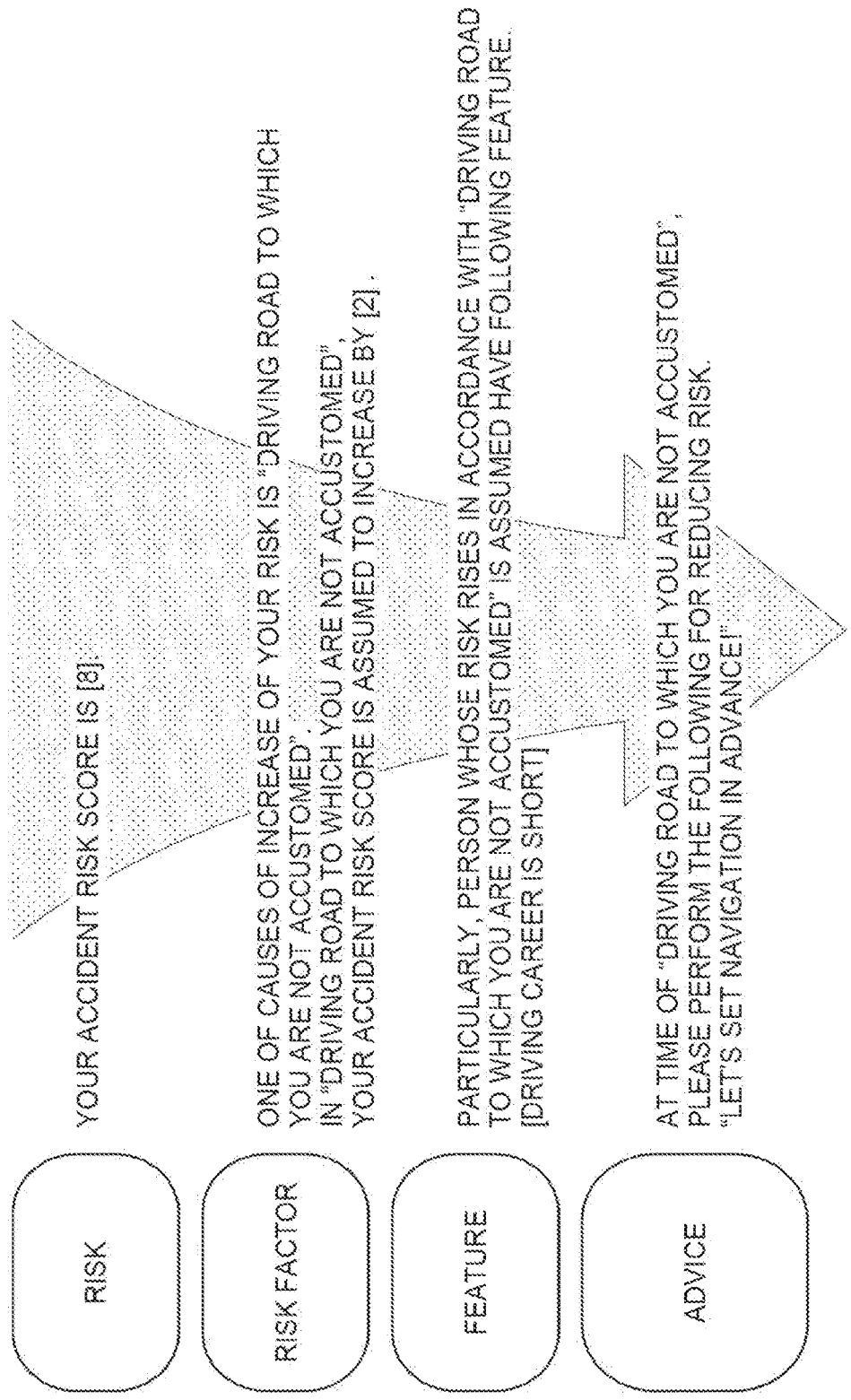
FIG. 7 is a diagram describing stepwise outputs of advice information.

FIG. 7 is a diagram describing stepwise outputs of advice information. In the example illustrated in FIG. 7, first, as information representing an estimated risk, a message "Your accident risk score is [8]" is output. Next, as information representing a risk causal effect, a message "As one reason for increasing your risk, there is "driving of a road to which you are not accustomed". Due to "driving of a road to which you are not accustomed to", it is assumed that your accident risk score has been increased by "2"" is output. In addition, in the example illustrated in FIG. 7, although only the risk causal effect for a single risk factor is represented, only a risk factor having a high risk causal effect may be represented, and risk causal effects for a plurality of risk factors may be represented. Subsequently, as information representing a degree of influence of a feature of a user for the estimated risk causal effect, a message "A person for whom the risk may easily rise particularly due to "driving of a road to which he or she is not accustomed" is assumed to have the following features. "Driving career is short" is output. In addition, in the example illustrated in FIG. 7, although not influences of features but only the features are represented, in a case in which only features having high degrees of influence are represented, it can be regarded that substantially a feature and a degree of influence thereof (in this case, a degree of influence "High") is represented. Furthermore, not only features are represented but also degrees of influence of the features may be represented together. Finally, as an advice detail, a message "At the time of "driving of a road to which you are not accustomed", in order to lower the risk, please perform the following. "Let's set the navigation in advance"" is output.

Next, a learning process and an estimation process performed by the behavioral change promotion device 1 according to this embodiment will be described with reference to FIGS. 8 and 9.

Figure 8:
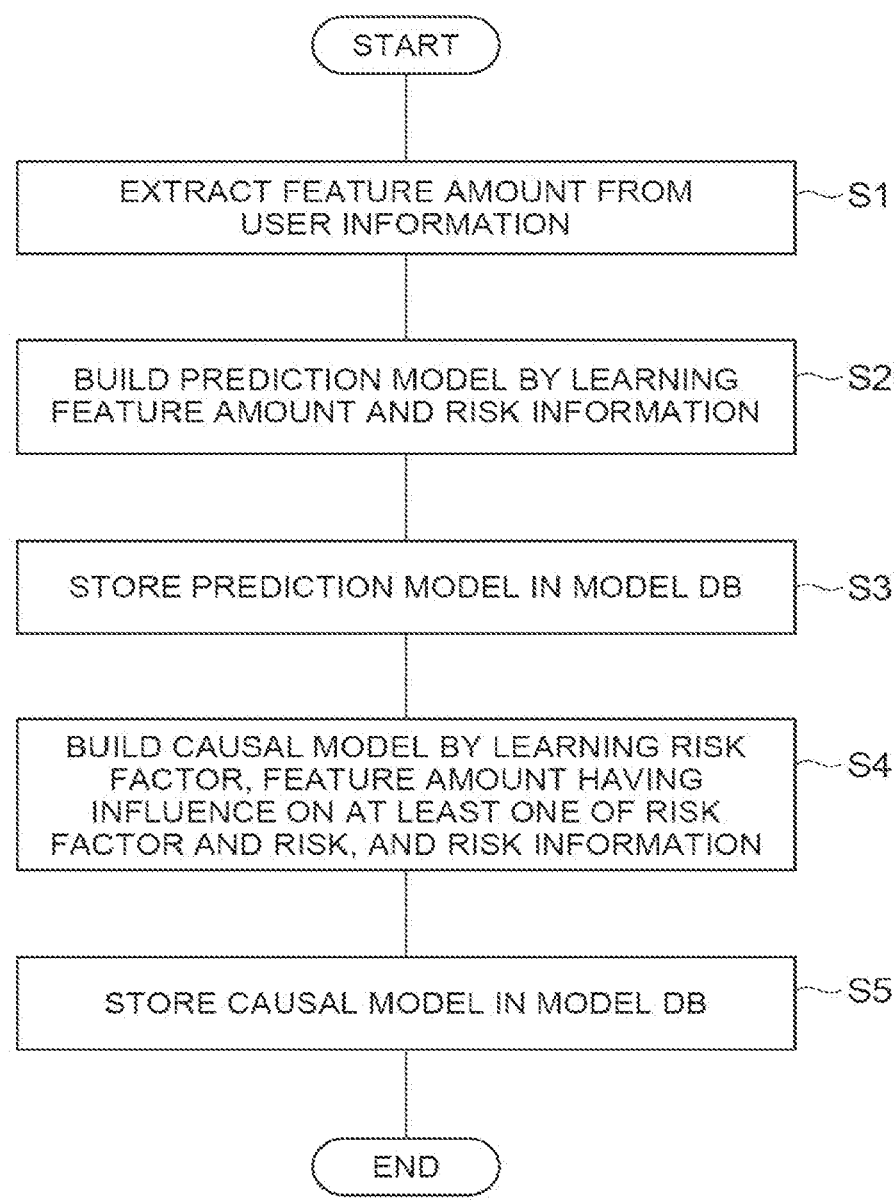
FIG. 8 is a flowchart illustrating a learning process performed by the behavioral change promotion device according to this embodiment.

FIG. 8 is a flowchart illustrating a learning process performed by the behavioral change promotion device 1. Processes of Steps S2 and S3 and processes of Steps S4 and S5 illustrated in a flowchart of FIG. 8 may not be necessarily performed in orders illustrated in FIG. 8. In other words, the processes of Steps S4 and Step S5 may be performed before the processes of Steps S2 and S3 or may be performed simultaneously with the processes of Steps S2 and S3. Similarly, processes of Steps S12 and S13 and processes of Steps S14 and S15 illustrated in a flowchart of FIG. 9 may not be necessarily performed in orders illustrated in FIG. 9. In other words, the processes of Steps S14 and Step S15 may be performed before the processes of Steps S12 and S13 or may be performed simultaneously with the processes of Steps S12 and S13. As illustrated in FIG. 8, in the learning process, first, feature amounts are extracted from learning user information (Step S1). Subsequently, learning is performed with the feature amounts and risk information being associated with each other, whereby a prediction model used for estimating a user's risk is built (Step S2). The prediction model is stored in the model DB 15 (Step S3).

In addition, learning is performed with a feature amount that is a risk factor having an influence on a risk, a feature amount having an influence on at least one of the risk factor or the risk, and risk information, which are information included in the learning user information, being associated with each other, and a causal model used for estimating a risk causal effect that is a degree of increase of the risk according to having a predetermined risk factor is built (Step S4). In addition, in building of a causal model, for example, a feature amount having an influence on at least one of the risk factor or the risk may not be used. In other words, learning is performed with a feature amount that is a risk factor and risk information being associated with each other, and a causal model used for estimating a risk causal effect may be built. The causal model is stored in the model DB 15 (Step S5). The learning process has been described above.

Figure 9:
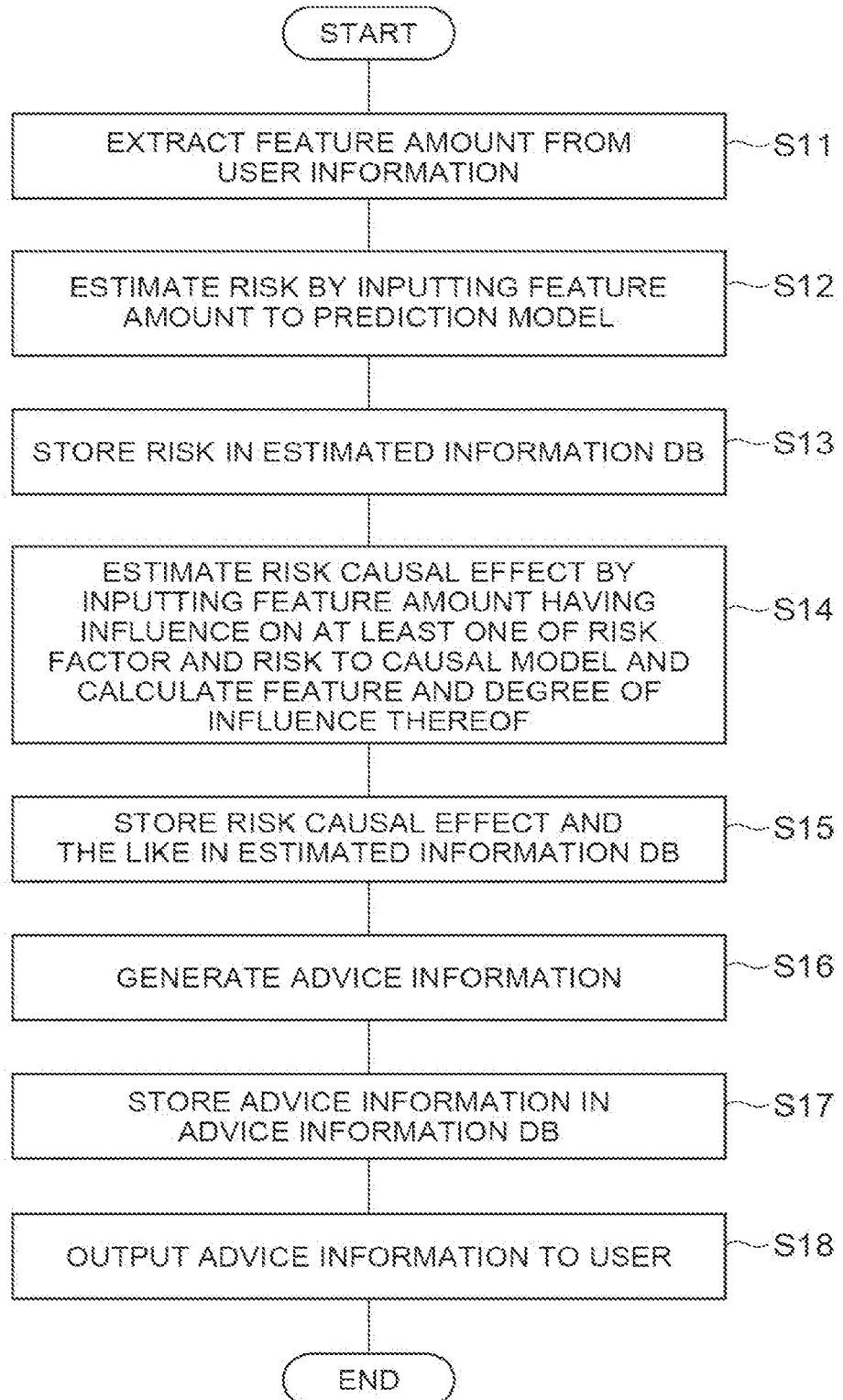
FIG. 9 is a flowchart illustrating an estimation process performed by the behavioral change promotion device according to this embodiment.

FIG. 9 is a flowchart illustrating the estimation process performed by the behavioral change promotion device 1. As illustrated in FIG. 9, in the estimation process, first, a feature amounts is extracted from the estimation user information (Step S11). Subsequently, by inputting the feature amount to the prediction model, a risk of a user is estimated (Step S12). The estimated risk is stored in the estimation information DB 17 (Step S13).

In addition, by inputting a feature amount having an influence on at least one of a risk factor or a risk included in information relating to a risk factor having an influence on the risk, which is information included in the estimation user information to the causal model, a risk causal effect is estimated, and a degree of influence of a feature (a feature amount having an influence on at least one of a risk factor or a risk) of a user for the risk causal effect is calculated from a parameter of the learned causal model (Step S14). In addition, for example, in a case in which "a feature amount having an influence on at least one of a risk factor or a risk" is not used in learning or the like, without inputting such information to the causal model, a risk causal effect may be estimated using a causal model. The risk causal effect and the like that have been estimated are stored in the estimated information DB 17 (Step S15).

Subsequently, on the basis of the information of the estimated information DB 17 and the information of the advice master information DB 18, advice information is generated (Step S16). The generated advice information is stored in the advice information DB 20 (Step S17). Finally, the advice information is presented (output) to a user (Step S18). The estimation process has been described as above.

Next, operations and effects of this embodiment will be described.

The behavioral change promotion device 1 according to this embodiment is a behavioral change promotion device presenting information used for reducing a risk of an unexpected situation to a user and includes the learning unit 14 that builds a prediction model used for estimating a risk of a user by performing learning with learning user information relating to the user and the risk information that is information relating to a risk of the user being associated with each other and builds a causal model used for estimating a risk causal effect that is a degree of increase of the risk according to having a risk factor by performing learning with information relating to the risk factor having an influence on the risk, which is information included in the learning user information, and risk information being associated with other, the estimation unit 16 that estimates a risk of a user by inputting a prediction model to estimation user information relating to the user and estimates a risk causal effect using a causal model, the advice generating unit 19 that generates advice information including at least the risk estimated by the estimation unit 16 and the risk causal effect estimated by the estimation unit 16, and the output unit 21 that outputs the advice information.

In the behavioral change promotion device 1 according to this embodiment, a prediction model estimating a risk from the user information and the risk information and a causal model estimating a risk causal effect that is a degree of increase of the risk according to having a risk factor from information relating to the risk factor included in the user information and the risk information are built. Then, in the behavioral change promotion device 1 according to this embodiment, a risk of a user is estimated by inputting the estimation user information to the prediction model, a risk causal effect is estimated using a causal model, advice information including the risk and the risk causal effect is generated, and this advice information is output. In this way, according to this behavioral change promotion device 1, in addition to the prediction model estimating a risk, the causal model estimating a risk causal effect that is a degree of increase of the risk according to having the risk factor is built, and a risk causal effect according to a predetermined risk factor is estimated using this causal model. By generating and outputting the advice information including such a risk causal effect, a degree of increase of the risk according to having the risk factor is presented to a user, and the user is caused to accurately perceive an influence of the risk factor on the risk. In accordance with this, the user can be encouraged to perform an effective behavioral change against the risk. In addition, by unitarily estimating the risk and the risk causal effect, processing efficiency relating to behavioral change promotion can be improved.

The information relating to a risk factor includes a feature amount that is the risk factor and a feature amount having an influence on at least one of the risk factor or the risk, and the learning unit 14 may build a causal model by performing learning with the feature amount that is the risk factor, the feature amount having an influence on at least one of the risk factor or the risk, and the risk information being associated with each other. In accordance with this, a causal model capable of more appropriately estimating the risk causal effect can be built.

The feature amount having an influence on at least one of the risk factor or the risk may include information representing a feature of a user. In accordance with this, a risk causal effect in which features of a user are taken into account can be estimated.

By inputting a feature amount having an influence on at least one of a risk factor or a risk included in information relating to a risk factor having an influence on the risk, which is information included in the estimation user information, to the causal model, the estimation unit 16 may estimate a risk causal effect. In this way, by inputting the information relating to a risk factor to the causal model, the risk causal effect can be estimated more appropriately.

The estimation unit 16 may calculate a degree of influence of a feature amount having an influence on at least one of a risk factor or a risk that is applied to the risk causal effect on the basis of the causal model. In addition, on the basis of a degree of influence of a feature amount having an influence on at least one of a risk factor or a risk, which is calculated on the basis of the causal model, applied to the risk causal effect and information relating to having/no-having of a feature amount having an influence on at least one of a risk factor or a risk in the user, the estimation unit 16 may calculate a degree of influence of the feature amount (a feature amount having an influence on at least one of a risk factor or a risk) held by this user that is applied to the risk causal effect. In this way, by calculating a degree of influence of a feature amount (a feature amount having an influence on at least one of a risk factor or a risk) for a risk causal effect, for example, user's features and the like for which the risk causal effect may easily increase can be calculated.

The advice generating unit 19 may generate advice information further including a degree of influence of a feature of a user that is a feature amount having an influence on at least one of a risk factor for a risk causal effect or a risk that is calculated by the estimation unit 16. In this way, the degree of influence of a feature of a user for a risk causal effect is calculated using a causal model, and advice information including the degree of influence of the feature of this user is generated and output, whereby, for example, a feature of the user for which the risk causal effect can easily increase and a degree of influence thereof are presented to the user. Then, on the basis of a degree of influence of a predetermined feature amount in the risk causal effect of the predetermined risk factor calculated above and the information relating to having/no-having of this feature amount in a predetermined user, a degree of influence of the feature amount held by this user in the risk causal effect of this risk factor may be calculated. By presenting such information to the user, the user is allowed to perceive the influence of his or her feature on the risk causal effect and can understand that an increase of the risk is an event due to his or her feature. In accordance with this, the user can be appropriately encouraged to perform an effective behavioral change against the risk.

The advice generating unit 19 may generate advice information further including a behavioral change promotion detail that is information representing a behavior that the user is encouraged to perform for reducing the risk that is information associated with a risk factor relating to the risk causal effect estimated by the estimation unit 16 in advance. In accordance with this, a behavioral change promotion detail according to a risk factor is presented to the user, and the user can be encouraged to perform an effective behavioral change against the risk.

In the advice information, the output unit 21 may, first, output the risk estimated by the estimation unit 16, then, output the risk causal effect estimated by the estimation unit 16, then, output the degree of influence of the feature of the user on the risk causal effect estimated by the estimation unit 16, and, finally, output a behavioral change promotion detail. In this way, from relative abstract information (risk), in a stepped manner, information according to a feature of this user relating to the risk is presented, and, finally, a specific behavioral change promotion detail is presented, and thus, in a state in which user's interest in the risk is raised, a specific behavioral change promotion detail is presented, and the user can be encouraged to perform an effective behavioral change against the risk. In addition, the output unit 21 may not output the degree of influence of the feature of the user.

Figure 10:
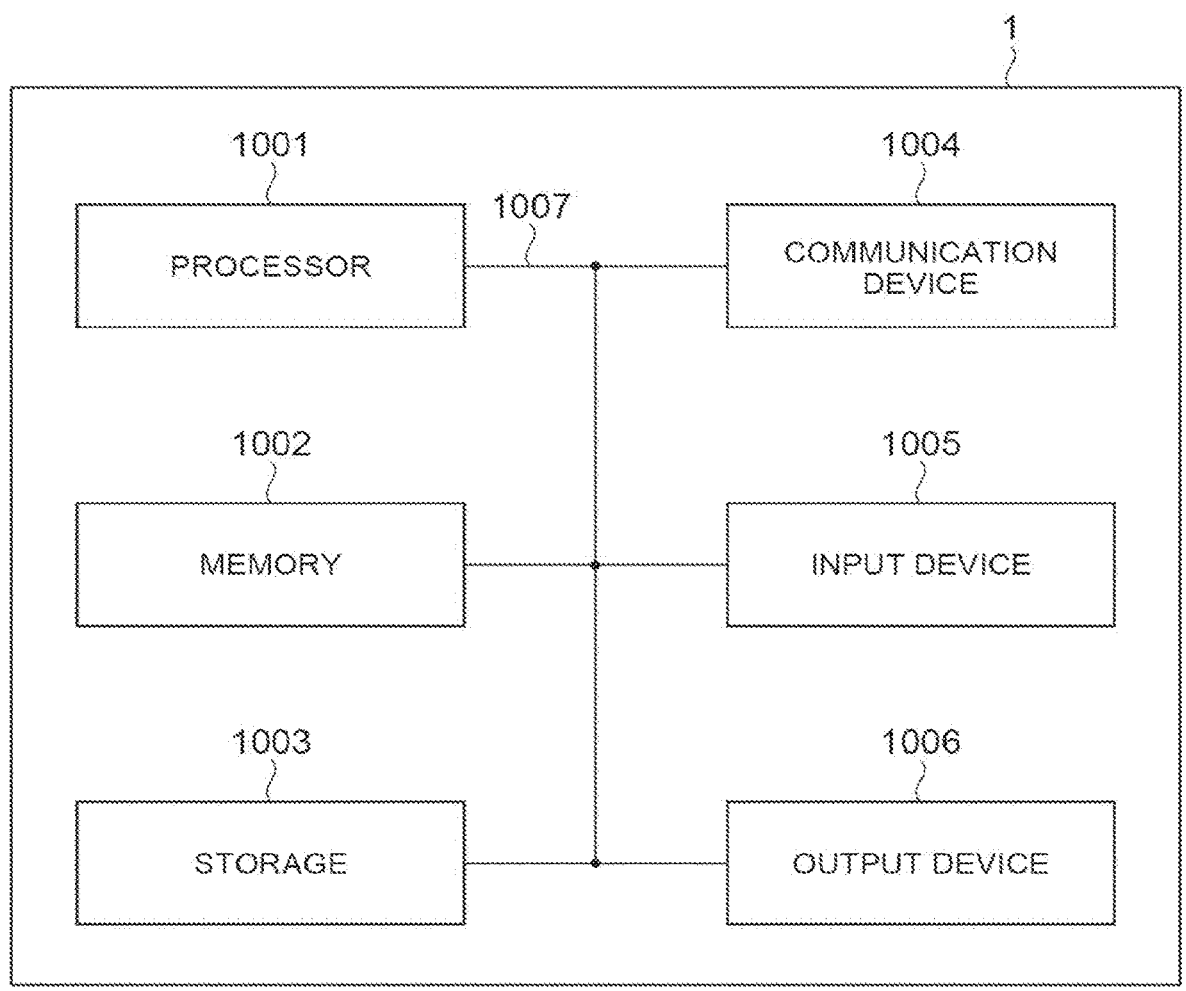
FIG. 10 is a diagram illustrating a hardware configuration of the behavioral change promotion device according to this embodiment.

Next, the hardware configuration of the behavioral change promotion device 1 will be described with reference to FIG. 10. The behavioral change promotion device 1 may be physically configured as a computer device including a processor 1001, a memory 1002, a storage 1003, a communication device 1004, an input device 1005, an output device 1006, a bus 1007, and the like.

In addition, in the following description, a term "device" may be rephrased as a circuit, a device, a unit, or the like. The hardware configuration of the behavioral change promotion device 1 may be configured to include one or a plurality of devices illustrated in FIG. 10 or may be configured not to include some of the devices.

Each function of the behavioral change promotion device 1 is realized by the processor 1001 performing an arithmetic operation and controlling communication using the communication device 1004 and data reading and/or writing for the memory 1002 and the storage 1003 by causing the processor 1001 to read predetermined software (a program) onto hardware such as the memory 1002 or the like.

The processor 1001, for example, controls the entire computer by operating an operating system. The processor 1001 may be configured by a central processing unit (CPU) including an interface with peripheral devices, a control device, an arithmetic operation device, a register, and the like. For example, the control functions of the learning unit 14 and the like may be realized by the processor 1001.

In addition, the processor 1001 reads a program (program code), a software module, and data from the storage 1003 and/or the communication device 1004 into the memory 1002 and executes various processes in accordance with this. As the program, a program causing the computer to execute at least some of the operations described in the embodiment described above is used.

For example, the control functions of the learning unit 14 and the like may be realized by a control program that is stored in the memory 1002 and is operated by the processor 1001, and other functional blocks may be similarly realized. While various processes described above have been described as being executed by one processor 1001, the processes may be executed by two or more processors 1001 simultaneously or sequentially. The processor 1001 may be realized using one or more chips. In addition, the program may be transmitted from a network through a telecommunication line.

The memory 1002 is a computer-readable recording medium and, for example, may be configured by at least one of a read only memory (ROM), an erasable programmable ROM (EPROM), an electrically erasable programmable ROM (EEPROM), a random access memory (RAM), and the like. The memory 1002 may be referred to as a register, a cache, a main memory (a main storage device), or the like. The memory 1002 can store a program (a program code), a software module, and the like executable to perform a radio communication method according to one embodiment of the present invention.

The storage 1003 is a computer-readable recording medium and, for example, may be configured by at least one of an optical disc such as a compact disc ROM (CD-ROM), a hard disk drive, a flexible disk, a magneto-optical disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above, for example, may be a database including the memory 1002 and/or storage 1003, a server, or any other appropriate medium.

The communication device 1004 is hardware (a transmission/reception device) for performing inter-computer communication through a wired and/or wireless network and, for example, may also be called as a network device, a network controller, a network card, a communication module, or the like.

The input device 1005 is an input device (for example, a keyboard, a mouse, a microphone, a switch, a button, a sensor, or the like) accepting an input from the outside. The output device 1006 is an output device (for example, a display, a speaker, an LED lamp, or the like) performing output to the outside. In addition, the input device 1005 and the output device 1006 may have an integrated configuration (for example, a touch panel).

In addition, devices such as the processor 1001, the memory 1002, and the like are interconnected through a bus 1007 for communication of information. The bus 1007 may be configured as a single bus or may be configured using buses different for devices.

In addition, the behavioral change promotion device 1 may be configured to include hardware such as a microprocessor, a digital signal processor (DSP), an application specific integrated circuit (ASIC), a programmable logic device (PLD), a field programmable gate array (FPGA), or the like, and a part or the whole of each functional block may be realized by hardware. For example, the processor 1001 may be realized using at least one of such hardware components.

As above, while the present embodiment has been described in detail, it is apparent to a person skilled in the art that the present invention is not limited to the embodiments described in this specification. The embodiment may be modified or changed without departing from the concept and the scope of the present invention set in accordance with the claims. Thus, the description presented in this specification is for the purpose of exemplary description and does not have any limited meaning for the embodiment.

Each aspect/embodiment described in the present specification may be applied to long term evolution (LTE), LTE-advanced (LTE-A), Super 3G, IMT-advanced, 4G, 5G, future ratio access (FRA), W-CDMA (registered trademark), GSM (registered trademark), CDMA 2000, ultra mobile broadband (UMB), IEEE 802.11 (Wi-Fi), IEEE 802.16 (WiMAX), IEEE 802.20, ultra-wideband (UWB), Bluetooth (registered trademark), a system using another appropriate system and/or a next generation system extended based on these.

The processing sequence, the sequence, the flowchart, and the like of each aspect/embodiment described in the present specification may be changed in order as long as there is no contradiction. For example, in a method described in the present specification, elements of various steps are presented in an exemplary order, and the method is not limited to the presented specific order.

The input/output information and the like may be stored in a specific place (for example, a memory) or managed using a management table. The input/output information and the like may be overwritten, updated, or additionally written. The output information and the like may be deleted. The input information and the like may be transmitted to another device.

A judgment may be performed using a value ("0" or "1") represented by one bit, may be performed using a Boolean value (true or false), or may be performed using a comparison between numerical values (for example, a comparison with a predetermined value).

The aspects/embodiments described in the present specification may be individually used, used in combination, or be switched therebetween and used in accordance with execution. In addition, a notification of predetermined information (for example, a notification of "being X") is not limited to be performed explicitly and may be performed implicitly (for example, a notification of the predetermined information is not performed).

It is apparent that software, regardless whether it is called software, firmware, middleware, a microcode, a hardware description language, or any other name, be widely interpreted to mean a command, a command set, a code, a code segment, a program code, a program, a subprogram, a software module, an application, a software application, a software package, a routine, a subroutine, an object, an executable file, an execution thread, an order, a function, and the like.

In addition, software, a command, and the like may be transmitted and received via a transmission medium. For example, in a case in which software is transmitted from a website, a server, or any other remote source using wiring technologies such as a coaxial cable, an optical fiber cable, a twisted pair, a digital subscriber line (DSL) and the like and/or radio technologies such infrared rays, radio waves, and microwaves, and the like, such wiring technologies and/or radio technologies are included in the definition of the transmission medium.

Information, information, a signal, and the like described in the present specification may be represented using any one among other various technologies. For example, data, an instruction, a command, information, a signal, a bit, a symbol, a chip, and the like described over the entire description presented above may be represented using a voltage, a current, radiowaves, a magnetic field or magnetic particles, an optical field or photons, or an arbitrary combination thereof.

In addition, a term described in the present specification and/or a term that is necessary for understanding the present specification may be substituted with terms having the same meaning or a meaning similar thereto.

In addition, information, a parameter, and the like described in the present specification may be represented using absolute values, relative values from predetermined values, or other corresponding information.

A communication terminal may be called by a person skilled in the art as a mobile communication terminal, a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or any other appropriate term.

Description of "on the basis of" used in the present invention does not mean "only on the basis of" unless otherwise mentioned. In other words, description of "on the basis of" means both "only on the basis of" and "at least on the basis of."

In the present specification, in a case in which names such as "first," "second," and the like is used, referring to each element does not generally limit the amount or the order of such an element. Such names may be used in the present specification as a convenient way for distinguishing two or more elements from each other. Accordingly, referring to the first and second elements does not mean that only the two elements are employed therein or the first element precedes the second element in a certain form.

As long as "include," "including," and modifications thereof are used in the present specification or the claims, such terms are intended to be inclusive like a term "comprising." In addition, a term "or" used in the present specification or the claims is intended to be not an exclusive logical sum.

In the present specification, other than a case in which clearly only one device is present in a context or technically, a device includes a plurality of devices.

In the entirety of the present specification, unless a singular form is represented clearly from the context, plural forms are included.

REFERENCE SIGNS LIST

1 Behavioral change promotion device
14 Learning unit (first learning unit, second learning unit)
16 Estimation unit (first estimation unit, second estimation unit, calculation unit)
19 Advice generating unit
21 Output unit

The invention claimed is:

1. A behavioral change promotion device presenting information used for reducing a risk of an unexpected situation to a user, the behavioral change promotion device comprising:
processing circuitry configured to
build a first learning model used for estimating a risk of the user by performing learning with learning user information relating to the user and risk information that is information relating to the risk of the user being associated with each other;
build a second learning model used for estimating a risk causal effect that is a degree of increase of a risk according to having a risk factor by performing learning with information relating to a risk factor having an influence on a risk that is information included in the learning user information and the risk information being associated with each other;
estimate the risk of the user by inputting estimation user information relating to the user to the first learning model;
estimate the risk causal effect using the second learning model;
generate advice information including at least the estimated risk and the estimated risk causal effect estimated by the second estimation unit; and
output the advice information.

2. The behavioral change promotion device according to claim 1,
wherein the information relating to the risk factor includes a feature amount that is a risk factor and a feature amount having an influence on at least one of the risk factor or the risk, and
wherein the processing circuitry builds the second learning model by performing learning with the feature amount that is the risk factor, the feature amount having an influence on at least one of the risk factor or the risk, and the risk information being associated with each other.

3. The behavioral change promotion device according to claim 2, wherein the feature amount having an influence on at least one of the risk factor or the risk includes information representing a feature of the user.

4. The behavioral change promotion device according to claim 1, wherein the processing circuitry estimates the risk causal effect by inputting a feature amount having an influence on at least one of the risk factor or the risk included in information relating to a risk factor having an influence on the risk that is information included in the estimation user information to the second learning model.

5. The behavioral change promotion device according to claim 1, wherein the processing circuitry is configured to calculate a degree of influence of a feature amount having an influence on at least one of the risk factor or the risk included in information relating to a risk factor having an influence on the risk that is information included in the estimation user information on the risk causal effect on the basis of the second learning model.

6. The behavioral change promotion device according to claim 5, wherein the processing circuitry calculates a degree of influence of a feature amount held by the user on the risk causal effect on the basis of the degree of influence of the feature amount having an influence on at least one of the risk factor or the risk calculated on the basis of the second learning model on the risk causal effect and information relating to having/no-having of the feature amount having an influence on at least one of the risk factor or the risk in the user.

7. The behavioral change promotion device according to claim 6, wherein the processing circuitry generates the advice information further including the degree of influence of the feature amount having an influence on at least one of the calculated risk factor or the calculated risk for the risk causal effect.

8. The behavioral change promotion device according to claim 1, wherein the processing circuitry generates the advice information further including a behavioral change promotion detail that is information representing a behavior the user is encouraged to perform for reducing the risk that is information associated with the risk factor relating to the estimated risk causal effect.

9. The behavioral change promotion device according to claim 8, wherein, in the advice information, the processing circuitry first outputs the estimated risk, then outputs the estimated risk causal effect, and finally outputs the behavioral change promotion detail.

10. The behavioral change promotion device according to claim 9, wherein the processing circuitry is configured to calculate a degree of influence of a feature amount having an influence on at least one of the risk factor or the risk included in information relating to a risk factor having an influence on the risk that is information included in the estimation user information on the risk causal effect on the basis of the second learning model, wherein, in the advice information, after outputting the estimated risk causal effect estimated by the processing circuit and before outputting the behavioral change promotion detail, the processing circuitry outputs the degree of influence of the feature amount having an influence on at least one of the calculated risk factor or the calculated risk for the risk causal effect.

11. A method, implemented by processing circuitry of a behavioral change promotion device presenting information used for reducing a risk of an unexpected situation to a user, the method comprising:
building a first learning model used for estimating a risk of the user by performing learning with learning user information relating to the user and risk information that is information relating to the risk of the user being associated with each other;
building a second learning model used for estimating a risk causal effect that is a degree of increase of a risk according to having a risk factor by performing learning with information relating to a risk factor having an influence on a risk that is information included in the learning user information and the risk information being associated with each other;
estimating the risk of the user by inputting estimation user information relating to the user to the first learning model;
estimating the risk causal effect using the second learning model;
generating advice information including at least the estimated risk and the estimated risk causal effect; and
outputting the advice information.

* * * * *